United States Patent Office 3,393,233
Patented July 16, 1968

3,393,233
METHOD FOR RECOVERING ETHYLENE DIAMINE TETRAACETIC ACID
Herfried Richter, Lutherstadt, Wittenberg, Germany, assignor to VEB Stickstoffwerk Piesteritz, Lutherstadt, Wittenberg, Germany
No Drawing. Filed June 29, 1965, Ser. No. 468,152
2 Claims. (Cl. 260—534)

ABSTRACT OF THE DISCLOSURE

A method for recovering ethylene diamine tetraacetic acid (EDTA) from copper-containing solutions obtained in the separation of rare earths (RE) wherein the copper complex formed by reaction between the rare earths complexes of the EDTA and a cation exchange resin present in the $Cu^{2+}$-form is converted into the iron (III)-complex by reaction with a cation exchange resin present in the $Fe^{3+}$-form and subsequent decomposition of the iron (III) complex by a concentrated alkaline solution having a pH over 12, thus separating iron (III) hydroxide and thereafter precipitating EDTA from its tetrasodium salt by acidification.

---

The invention relates to a method for recovering ethylene diamine tetraacetic acid (EDTA) from copper-containing solutions, which are obtained in the separation of rare earths (RE) according to the ion-exchange method.

In the presently known methods, several ion-exchange columns, filled with a highly acidic cation exchanger resin, of which the first are laden with a mixture of $RE^{3+}$ and the following with $Cu^{2+}$, are arranged in series and eluted with a 0.5 to 1% solution of EDTA, adjusted with ammonia to a pH of 8.4. The rare earths form various stable complexes with EDTA. The following table contains the negative logarithm of the stability constants (lg K) of some complexes of EDTA (ethylene diamine tetraacetic acid is a tetrabasic acid, and it is hereinafter abbreviated as $H_4X$).

| Complex-ion: | lg K |
|---|---|
| $LaX^-$ | 14.72 |
| $CeX^-$ | 15.39 |
| $PrX^-$ | 15.75 |
| $NdX^-$ | 16.06 |
| $SmX^-$ | 16.55 |
| $EuX^-$ | 16.69 |
| $GdX^-$ | 16.70 |
| $TbX^-$ | 17.25 |
| $DyX^-$ | 17.57 |
| $HoX^-$ | 17.67 |
| $ErX^-$ | 17.98 |
| $TmX^-$ | 18.59 |
| $YbX^-$ | 18.68 |
| $LuX^-$ | 19.06 |
| $CuX^{2-}$ | 18.86 |
| $NiX^{2-}$ | 18.45 |
| $PbX^{2-}$ | 18.2 |
| $ZnX^{2-}$ | 16.58 |
| $FeX^{2-}$ | 14.45 |
| $FeX^-$ | 25.1 |
| $CaX^{2-}$ | 10.59 |

In the elution with EDTA solution, the rare earths move, as EDTA complexes, through the columns and are arranged in the order of the stability of their complexes. Copper forms with EDTA a more stable complex than do the rare earths. The RE-complexes formed in the first columns exchange in the following columns the RE-cation for the Cu-cation. A solution of the Cu-EDTA-complex flows off. Subsequent eluants dissolve the rare earths again from the exchanger, and the process starts once more until the first rare earths issue from the last column. The rare earths appear then in the order Lu-Yb-Tm-Ho . . . La in the eluate, which is collected in fractions. In this method larger quantities of solutions of the Cu-EDTA complex are obtained. At least half of the EDTA used is found in these solutions. The recovery of EDTA from these solutions is of particular importance for the economy of the method. EDTA is comparatively expensive.

The recovery of EDTA has presented up to now considerable difficulties. The copper complex is so stable that acidification of the solutions permits only a very incomplete recovery of the product, which is highly contaminated with copper. So much sulfuric acid must be used to destroy the copper complex that the liberated EDTA does not crystallize but remains in solution, forming salts (formation of the compound $H_6XSO_4$). The Cu-complex can be decomposed with hydrogen sulfide, in which case CuS and free EDTA are formed. A disadvantage of this method is that, due to the low solubility of EDTA, the latter is easily precipitated together with the CuS formed. I has been tried by electrolysis to deposit the Cu on the cathode from the Cu-EDTA-solutions. Though it is possible to deposit the Cu, the EDTA is destroyed during the electrolysis by anodic oxidation. The destruction of the EDTA can be avoided by separating the anode and the cathode chamber by a cation-exchanger diaphragm. Due to the relatively long duration of the electrolysis (over 1 hour per charge at 70° C.) very large electrolytic cells are required. Besides, the current costs in the electrolysis are very high.

It is the object of the invention to eliminate the above mentioned inconveniences by providing a practical method for recovering EDTA without the use of an electrolytic process, or by any such costly method.

It is a further object of the invention to provide a method for recovering ethylene diamine tetraacetic acid from copper-containing solutions obtained in the separation of rare earths and in which the ethylene diamine tetraacetic acid is present as a stable copper complex.

It is still a further object of the invention to provide a method for the conversion of the ethylene diamine tetraacetic acid copper complex into an iron (III)-complex with subsequent decomposition with strong alkali and then acidification by which the ethylene diamine tetraacetic acid is recovered.

The invention is based on the known fact that EDTA can be isolated in a very simple manner from solutions of the Fe(III)-EDTA- complex. The complex of the trivalent iron is extremely stable in neutral and weakly acid solutions, but it is decomposed in alkaline solutions, forming $Fe(OH)_3$. These solutions may also be treated with sodium hydroxide and calcium chloride:

$$FeX^- + 3OH^- + Ca^{2+} = Fe(OH)_3 + CaX^{2-}$$

The EDTA can be released from the resulting Ca-complex by acidification. Besides, the trivalent iron in the complex can be reduced to the bivalent stage by suitable reducing agents, such as $Na_2S_2O_4$ or $NaHSO_2 \cdot HCHO \cdot 2H_2O$. The Fe(II)-EDTA-complex is much less stable than the Fe(III)-EDTA-complex. From the Fe(II)-EDTA-complex, the EDTA can likewise be released by acidification.

According to the invention the Cu-EDTA-complex can be converted quantitatively into the Fe(III)-EDTA-complex in a very simple manner: The solutions of the Cu-EDTA-complex are adjusted with ammonia to pH 3–8 and passed through a cation-exchanger column laden with $Fe^{3+}$. The Cu-complex exchanges the Cu-cation for the Fe(III)-cation. The resulting eluate is a practically copper-free solution of the Fe(III)-complex, from which the EDTA can be obtained in a known manner. An addition of calcium chloride is not absolutely necessary. It was found that the Fe(III)-complex can also be decomposed by NaOH alone:

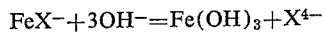

When working with excess NaOH, Fe(OH)$_3$ and a solution of the tetrasodium salt of EDTA were obtained, from which the free EDTA can be readily obtained by acidification with sulfuric acid. The Fe(III)-complex can also be formed by the action of soluble Fe(III)-salts on the Cu-complex:

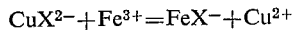

The resulting Cu-ions are removed together with the excess Fe(III)-ions by means of a cation exchanger, which is laden with alkali or ammonium-ions. The Fe(III)-complex does not react with the exchangers.

The method according to the invention for recovering EDTA from solutions of the Cu-EDTA complex requires no special apparatus and can be easily and safely controlled. Simple agitator vessels with a heating device and ion exchange filters can be used, as they are customary in the chemical industry and in water preparation, respectively.

The method according to the present invention, for recovering ethylene diamine tetraacetic acid, is illustrated by the following examples:

Example 1

1000 ml. of a copper-containing EDTA solution, which was obtained in the separation of rare earths, and which contained 8.43 g. EDTA and 1.79 g. Cu, were adjusted with ammonia to pH 5 and conducted with a flow velocity of 4 cm./min. through an exchange column, filled with 50 ml. cation exchanger DOWEX 50 W (grain size 0.3 mm., Fe$^{3+}$-form). Then the column was washed with 50 ml. water. The eluate was heated to 90° C. and made highly alkaline with sodium hydroxide under stirring, and the iron was completely precipitated as Fe(OH)$_3$. After standing for 4 hours, the Fe(OH)$_3$ had settled to a large extent. The supernatant clear solution was decanted and the sludge transferred to centrifugal glasses. Another portion of clear solution was obtained by centrifuging. The centrifuged Fe(OH)$_3$-sludge was discarded and the clear solution adjusted with 50% sulfuric acid to pH 1.2. After standing for 24 hours, EDTA had crystallized in coarse crystals. The crystals were colored light blue by traces of Cu.

7.56 g. EDTA with 0.0008% CuO were obtained—0.63 g. EDTA remained in solution. Consequently 89.7% of the EDTA contained in the starting solution could be obtained in crystalline form. 7.5% were obtained as dilute solution. An additional crystalline substance could be obtained by evaporating this solution.

Example 2

1000 ml. of the solution used in Example 1 were mixed under stirring at room temperature with a cold-saturated, weak acidic iron (III)-nitrate solution until a sample of 0.5 ml. showed a clear red coloration after addition of 3 ml. 20% KSCN solution. The solution was then conducted with a flow velocity of 10 cm./min. through an exchange column filled with 50 ml. of the cation exchanger Wofatit KPS (grain size 0.3–1.5 mm. Na$^+$-form). The eluate was treated in the same manner as in Example 1.

7.42 g. EDTA (=87.9%) were obtained in crystalline form and 0.71 g. EDTA (=8.4%) as solution. The centrifuged Fe(OH)$_3$-sludge still contained 0.10 g. EDTA (=1.2%).

The foregoing disclosure relates only to preferred embodiments of the invention which is intended to include all changes and modifications of the examples described within the scope of the invention as set forth in the appended claims.

What I claim is:

1. A method for recovering ethylene diamine tetraacetic acid from copper-containing solutions obtained in the separation of rare earths, which comprises converting the copper complex, formed by reaction between rare earth-complexes of ethylene diamine tetraacetic acid and a cation exchange resin present in the Cu$^{2+}$-form, into the iron (III)-complex, by reaction with a cation exchange resin, present in the Fe$^{3+}$-form, subsequently decomposing the iron (III)-complex by a concentrated solution of sodium hydroxide in an amount sufficient to provide a pH of more than 12 with the separation of iron (III)-hydroxide, and precipitating the ethylene diamine tetraacetic acid from the solution of its tetrasodium salt by acidification with sulfuric acid and in amount sufficient to reduce the pH to below 1.2.

2. A method according to claim 1, in which the conversion of the copper complex into the iron (III)-complex is effected by reaction of the solution at a pH range from 3 to 8 with soluble iron (III)-salts, and the excess iron (III)- and the resulting copper ions are removed by means of a cation exchange resin laden with ions selected from the group consisting of alkali metal- and ammonium ions.

References Cited

UNITED STATES PATENTS

| 2,798,789 | 7/1957 | Spedding et al. | 260—439 XR |
| 3,033,214 | 5/1962 | Bersworth et al. | 260—534 XR |
| 3,138,637 | 6/1964 | Lindstrom et al. | 260—534 |
| 3,148,947 | 9/1964 | Fleishmann | 23—125 |

OTHER REFERENCES

Starostin et al.: Chemical Abstracts, vol. 57:15873 (h) (1962).

Zabin: Dissertation Abstracts, vol. 23, pp. 4515–4516 (1963).

LORRAINE A. WEINBERGER, Primary Examiner.

A. HALLUIN, Assistant Examiner.